3,399,201
AMINOALKYL-ETHANO-ANTHRACENES
Paul Schmidt, Therwil, Max Wilhelm, Allschwil, and Kurt Eichenberger, Therwil, Switzerland, assignors to Ciba Corporation, New York, N.Y., a corporation of Delaware
No Drawing. Continuation-in-part of application Ser. No. 404,904, Oct. 19, 1964, and is a continuation-in-part of application Ser. No. 512,201, Dec. 7, 1965. This application Apr. 12, 1966, Ser. No. 541,979
Claims priority, application Switzerland, Nov. 29, 1960, 13,359/60; Oct. 10, 1961, 11,710/61; Nov. 1, 1963, 13,434/63; Dec. 23, 1964, 16,637/64; Nov. 24, 1965, 16,177/65; Dec. 10, 1965, 17,086/65
25 Claims. (Cl. 260—268)

The present application is a continuation-in-part of our application Ser. No. 404,904, filed Oct. 19, 1964, which is a continuation-in-part of our application Ser. No. 151,198 filed Nov. 9, 1961, and of our application Ser. No. 512,201 filed Dec. 7, 1965, all now abandoned.

The present invention concerns 9-aminoalkyl-9:10-dihydro-9:10-ethano-(1:2)-anthracenes containing the nucleus of the formula

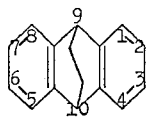

as well as of their quaternary ammonium derivatives and salts.

In the new compounds the amino group of the aminoalkyl residue may be unsubstituted, but it is preferably monosubstituted or disubstituted. Particularly suitable substituents are lower hydrocarbon residues which may be interrupted by hetero atoms such as oxygen, sulphur or nitrogen, and/or may be substituted by free hydroxyl, amino or mercapto groups or by halogen atoms such as fluorine, chlorine, bromine or iodine. As lower hydrocarbon residues there may be mentioned above all: lower alkyl or alkenyl groups such as methyl, ethyl, propyl, or isopropyl; straight or branched butyl, pentyl, hexyl, or heptyl radicals bound in any desired position; allyl or methallyl radicals unsubstituted or alkyl-substituted cycloalkyl or cyclo-alkenyl groups such as cyclopentyl, cyclohexyl, cycloheptyl, cyclopentenyl, cyclohexenyl groups; unsubstituted or akyl-substituted cycloalkyl-alkyl or cycloalkenyl-alkyl groups such as cyclopentyl- or cyclohexenyl-methyl, -ethyl or -propyl groups; aralkyl or aralkenyl such as phenyl-methyl, -ethyl, vinyl or propyl groups; or aryl, more especially phenyl radicals; or alkylene or alkenylene groups such, for example as butylene-(1:4), pentylene-(1:5), 1:5-dimethylpentylene-(1:5), hexylene-(1:6) and hexylene-(1:5). Residues of this kind interrupted by hetero atoms are, for example, alkoxyalkyl or oxa-cycloalkyl-alkyl groups such as methoxyethyl, ethoxyethyl propoxyethyl, butoxyethyl, methoxypropyl, methoxyethoxyethyl, tetrahydrofurylmethyl, methylmercaptoethyl, oxa-, aza- or thia-alkylene or -alkenylene residues such as 3-aza-, oxa- or thia-pentylene-(1:5), 3-azahexylene - (1:6), 1:5 - dimethyl-3-aza-pentylene-(1:5), 3-methyl - 3 - aza-pentylene-(1:5), or 3-hydroxyethyl-3-aza-pentylene-(1:5). The amino group is above all a mono- or di-lower alkyl-amino group such as the methylamino, ethylamino, n-butylamino, dimethylamino, diethylamino, dipropylamino, N-methyl-N-ethylamino group, or an N-lower alkyl-N-cycloalkylamino group such as the N-methyl-N-cyclopentyl or -cyclohexyl group; or a pyrrolidino, piperidino, morpholino or thia-morpholino groups such as the pyrrolidino, piperidino, morpholino, piperazino, N-methyl-, N-ethyl- or N-β-hydroxy-ethyl-piperazino group.

The fourth substituent on a quaternary ammonium group is above all a lower alkyl or alkenyl group such as a methyl, ethyl, allyl, propyl or benzyl group or a phenoxy-lower alkyl such as the phenoxyethyl group.

The alkylene residue which connects the aforementioned amino group with the anthracene nucleus is above all a lower unbranched or branched alkylene group which preferably contains 1 to 4 carbon atoms such, for example as a methylene, ethylene-(1:2), propylene-(1:2), propylene-(1:3), butylene-(1:2), butylene-(1:3), butylene-(2:3) or butylene-(1:4) residue.

The new compounds can be further substituted, for example, in positions 1 to 8 of the anthracene ring or on other aromatic rings by lower alkyl, alkoxy, alkenyloxy or alkylmercapto groups, by halogen atoms such as fluorine, chlorine, bromine or iodine or by the pseudohalogen trifluoromethyl, by alkylsulphonyl, alkanoyl, nitro or amino groups, and in this connection there may be mentioned as alkyl groups, for example, methyl, ethyl, propyl, isopropyl, butyl, isobutyl, or tertiary butyl; as alkoxy or alkenyloxy groups the methoxy, ethoxy, allyloxy or methylenedioxy group; as alkylmercapto the methylmercapto or ethylmercapto group; and as alkanoyl groups above all the acetyl, propionyl or butyryl residue. In position 10 the new compounds may contain above all an aliphatic hydrocarbon residue such as one of the abovementioned lower alkyl or alkenyl groups, or a halogen atom.

The new compounds have valuable pharmacological properties; inter alia they display an inhibitory action on the central nervous system characterized by an antagonism towards psychomotoric substances such, for example, as mescalin, and inhibit the transmission of spinal reflexes; and they can therefore be used as tranquilizers in human medicine. They are also suitable as additives to animal fodder, since they bring about a better intake.

In addition, the new compounds may be used as starting material or intermediates for the preparation of other valuable compounds.

Of special value are the 9-aminomethyl- and 9-aminopropyl - 9:10-dihydro-9:10-ethano-(1:2)-anthracenes and their salts and amongst them especially those in which the amino group is secondary or tertiary, preferably being a mono- or di-lower alkyl amino or cycloalkylamino, pyrrolidino, piperidino, morpholino, piperazino, N-methylpiperazino, N - ethylpiperazino or N - β - hydroxy-ethylpiperazino group.

Special mention deserve the compounds of the formula

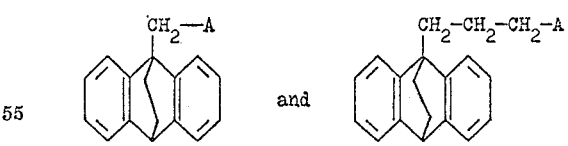

and their salts, in which A represents a secondary or tertiary amino group, more especially one of the last-mentioned amino groups, especially a dimethylamino- or methylamino group. Of primary importance are 9-methylamino-methyl-, 9-n-butylamino-methyl-, 9-dimethylaminomethyl- or 9 - diethylamino-methyl-9:'10-dihydro-9:10-ethano-(1:2)-anthracene, 9-γ-dimethylamino-propyl-9:10-dihydro-9:10-ethano-(1:2)-anthracene, 9-γ-methylaminopropyl-9:10-dihydro-9:10-ethano-(1:2)-anthracene and 9-[γ-(N' - hydroxyethyl-piperazino)-propyl]-9:10-dihydro-9:10-ethano-(1:2)-anthracene and their salts.

The new compounds are prepared by such known methods.

Thus, for example, a residue convertible into an aminoalkyl or ammonium-alkyl group, present in position 9 of a 9:10-dihydro-9:10-alkano-(1:2)-anthracene may be so converted. A residue convertible into an aminoalkyl or ammoniumalkyl group is for example one which is convertible into an aminoalkyl group by reduction, for example carbamyl, or carbamylalkyl groups which can be reduced in conventional manner, advantageously with lithium-aluminium hydride or a similar reducing agent for amides, to form the corresponding aminoalkyl groups.

Similarly, nitroalkyl, nitroalkenyl, cyano or cyanoalkyl groups can be reduced to the corresponding aminoalkyl groups, the reduction of said groupings being carried out with the use of a conventional agent such, for example as activated hydrogen, more especially catalytically activated hydrogen. Catalysts particularly suitable for this purpose are Rupe or Raney nickel, or platinum or palladium catalysts.

Further groups that can be reduced to aminoalkyl groups are iminoalkyl residues or the corresponding amino-hydroxy-alkyl residues which can be converted into the aminoalkyl residues with the use of a conventional reducing agent, primarily a metal hydride, for example a dilight metal hydride, such as alkali metal borohydride, or catalytically activated hydrogen, for which purpose platinum oxide and Raney nickel are especially suitable catalysts. As iminoalkyl residues there are suitable, apart from the usual Schiff's bases, also hydroxyimino-alkyl groups.

According to another process the 9:10-ethano-(1:2) residue is introduced in conventional manner into a 9-aminoalkyl-anthracene, or into a quaternary ammonium derivative or a salt thereof, advantageously with the use of ethylene, by the Diels-Alder method; depending on the reactivity of the anthracene compound this reaction may have to be carried out at an elevated temperature and/or under superatmospheric pressure and/or in the presence of a catalyst.

In a resulting primary, secondary or tertiary amino group further nitrogen substituents may be introduced in known manner, for example by treatment with a reactive ester, for example one of those mentioned above, or with a corresponding alcohol, or by reductive alkylation with the use of an appropriate carbonyl compound or by acylation with carboxylic acids or their functional derivatives and reduction of the obtained N-acyl compounds.

Furthermore, substituents may be introduced into the benzene nuclei, such as nitro groups, which may be effected by nitration. Substituents present in the molecule can be converted in the conventional manner, for example nitro groups on the aromatic residues may be reduced to amino groups.

The invention further includes any variant of the present process in which an intermediate obtained at any stage of the process is used as starting material and/or the remaining step or steps is/are carried out; or the process is discontinued at any stage thereof; or in which a starting material is formed in the course of the reaction, or used in the form of a quaternary ammonium compound or a salt thereof. Thus, for example, the starting material may be a 9 - oxoalkyl-9:10-dihydro-9:10-ethano-(1:2)-anthracene, for example a 9 - formyl or 9 - formylalkyl compound, which is treated under suitable reducing conditions, for example those mentioned above for reducing iminoalkyl groups, with ammonia or with a primary or secondary amine, which procedure yields as intermediate one of the aforementioned iminohydroxy or aminohydroxy compounds.

The aforementioned reactions are carried out in the usual manner in the presence or absence of diluents, condensing agents and/or catalysts, at room temperature or a lower or higher temperature, if desired under superatmospheric pressure.

The starting materials are known or can be prepared by known methods. Any new starting materials used are likewise included in the invention.

Depending on the reaction conditions and starting material used the new compounds are obtained in the free form or in the form of salts thereof. The salts of the new compounds can be converted in known manner into the free compounds, for example acid addition salts by reaction with a basic agent. On the other hand, a resulting free base may form salts with inorganic or orgainc acids. Acid addition salts are preferably manufactured with therapeutically useful acids, for example a hydrohalic acid such as hydrochloric or hydrobromic acid, perchloric, nitric or thiocyanic acid, a sulphuric or phosphoric acid, or an organic acid such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-amino-benzoic, 4-hydroxybenzoic, anthranilic, cinnamic, mandelic, salicyclic, 4-aminosalicyclic, 2-phenoxybenzoic, 2-acetoxybenzoic, methanesulphonic, ethanesulphonic, hydroxyethanesulphonic, benzenesulphonic, para-toluene-sulphonic, naphthalenesulphonic or sulphanilic acid; methionine, tryptophan, lysine or arginine. The salts may be monosalts or polysalts.

Quaternary ammonium salts may also be converted into the ammonium hydroxides, for example by treatment of an ammonium halide with freshly precipitated silver oxide, or by treating an ammonium sulphate with barium hydroxide solution, or with the use of a basic ion-exchanger, and from the resulting ammonium hydroxide other ammonium salts can be prepared by reaction with an acid, for example one of those mentioned above. If desired, this exchange may also be carried out directly with the use of a suitable ion-exchanger.

The new compounds are intended to be used as medicaments in the form of pharmaceutical preparations containing them in conjunction with a pharmaceutical organic or inorganic, solid or liquid excipient suitable for enteral (for example oral) or parenteral administration. Suitable excipients are substances that do not react with the new compounds such, for example, as water, gelatine, lactose, starch, magnesium stearate, talc, vegetable oils, benzyl alcohols, gums, polyalkylene glycols, cholesterol or other known medicinal excipients. The pharmaceutical preparations may be, for example, tablets, dragees or capsules, or in liquid form solutions, suspensions or emulsions. They may be sterilised and/or may contain assistants such as preserving, stabilising, wetting or emulsifying agents, salts for regulating the osmotic pressure or buffers. The dosage of the new compounds may vary according to the particular compound and the particular needs of the patient. Usually it is the range of 25–500 mg. daily, for example between 75 and 300 mg.; the dose may be divided and thus administered twice or three times a day. They may also contain other therapeutically valuable substances.

The new compounds may also be used in veterinary medicine, for example in one of the forms mentioned above, or in the raising and feeding of animals in the form of fodders or as additives to animal fodder, for example in admixture with the conventional extenders and diluents and feeding stuffs respectively.

The following examples illustrate the invention.

Example 1

A solution of 9.0 grams of 9:10-dihydro-9:10-ethano-(1:2)-anthracene-(9)-carboxylic acid diethylamide in 50 cc. of tetrahydrofuran is stirred dropwise at room temperature into a suspension of 2.5 grams of lithium aluminium hydride in 100 cc. of tetrahydrofuran. The mixture is heated for 3 hours at the boil and then cooled in ice. The organo-metal complexes and the excess of lithium-aluminium hydride are decomposed by carefully dropping in 2.5 cc. of water, 2.5 cc. of sodium hydroxide solution of 15% strength and 7.5 cc. of water. The granular precipitate formed is filtered off and the solvent is evaporated, to yield 9-diethylamino-methyl- 9:10-dihydro-9:10-ethano-(1:2)-anthracene of the formula

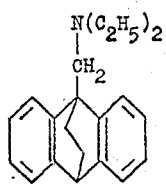

which melts at 112 to 115° C. after having been recrystallised from ehtanol. Its hydrochloride melts at 243 to 245° C.

The 9:10 - dihydro-9:10-ethano-(1:2)-anthracene-(9)-carboxylic acid dimethylamide used as starting material is prepared in the following manner:

A mixture of 10.0 grams of 9:10-dihydro-9:10-ethano-(1:2)-anthracene-(9)-carboxylic acid and 100 cc. of thionyl chloride is refluxed for 6 hours; the thionyl chloride is then evaporated to leave an oil which crystallises when left to itself for some time. Recrystallisation from petroleum ether yields the 9:10-dihydro-9:10-ethano-(1:2)-anthracene-(9)-carboxylic acid chloride of the formula

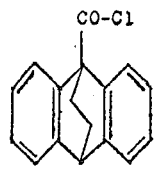

in crystals melting at 72 to 75° C.

10.0 grams of diethylamine in 25 cc. of benzene are vigorously stirred dropwise at room temperature into 5 grams of the acid chloride in 50 cc. of benzene. The mixture is stirred for 2 hours at 40° C. and then extracted with water. On evaporation of the benzene an oil remains which crystallises slowly. Recrystallization from aqueous methanol yields the 9:10-dihydro-9:10-ethano-(1:2)-anthracene-(9)-carboxylic acid diethylamide of the formula

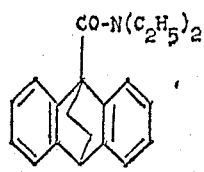

in crystals melting at 108 to 109° C.

Example 2

A mixture of 10.0 grams of 9:10-dihydro-9:10-ethano-(1:2)-anthracene-(9)-aldehyde, 6.0 grams of β-phenylethyl-amine and 150 cc. of benzene is boiled for 2 hours with the use of a water separator, whereupon the benzene is evaporated in vacuo. The residue is dissolved in 200 cc. of ethyl acetate, treated with 2 grams of Raney nickel and hydrogenated at room temperature under atmospheric pressure. The catalyst is then filtered off and the solvent evaporated, the residue being treated with 100 cc. of 2 N-hydrochloric acid, whereupon crystallisation sets in to yield the 9-(β-phenylethylaminomethyl)-9:10-dihydro-9:10-ethano-(1:2)-anthracene hydrochloride of the formula

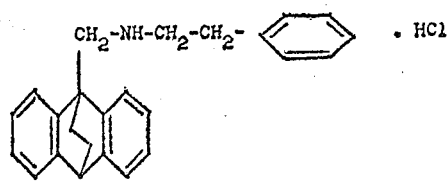

which melts at 253 to 255° C. after having been recrystallised from ethanol+ether.

The 9:10-dihydro-9:10-ethano-(1:2)-anthracene-(9)-aldehyde used as starting material is prepared as follows:

A solution of 50 grams of anthracene-(9)-aldehyde in 200 cc. of dimethylformamide is heated in an autoclave with ethylene to 170° C., the whole is cooled after 24 hours, and the solvent is evaporated in a water-jet vacuum. The residue is dissolved in a small amount of chloroform. On addition of ethanol the 9:10-dihydro-9:10-ethano-(1:2)-anthracene-(9)-aldehyde of the formula

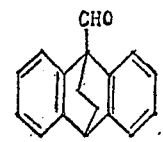

crystallises in the form of prisms melting at 106 to 107° C.

Example 3

A solution of 10.0 grams of 9:10-dihydro-9:10-ethano-(1:2)-anthracene-(9)aldehyde and 5.0 grams of n-butylamine in 150 cc. of benzene is boiled for 2 hours with the use of a water separator and then evaporated to dryness. The residue is dissolved in 100 cc. of ethanol, treated with 2.0 grams of Raney nickel and hydrogenated at room temperature under atmospheric pressure. When hydrogen is no longer being consumed, the catalyst is filtered off and the solvent evaporated, to yield 9-(n-butyl-amino-methyl)-9:10 - dihydro - 9:10 - ethano - (1:2) - anthracene of the formula

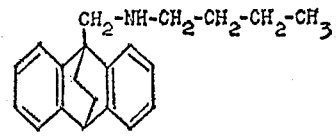

which melts at 76 to 78° C. after having been recrystallised from ethanol.

Example 4

A solution of 10 grams of 9:10-dihydro-9:10-ethano-(1:2)-anthracene-(9)aldehyde and 10 grams of monomethylamine in 100 cc. of ethanol is heated at 80° C. for 4 hours in an autoclave. The reaction mixture is then evaporated to dryness under reduced pressure to leave a crystalline residue which is dissolved in 150 cc. of ethanol and, after the addition of 2 grams of Raney nickel, hydrogenated at 40° C. under atmospheric pressure. When the absorption of hydrogen has subsided, the catalyst is filtered off and the filtrate evaporated under reduced pressure. An oil remains which is covered with 100 cc. of 2 N-hydrochloric acid. The 9-methylamino-methyl-9:10-dihydro-9:10-ethano-(1:2)-anthracene hydrochloride of the formula

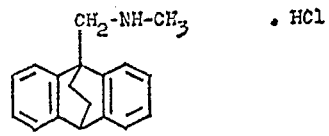

crystallises immediately; after crystallization from methanol it melts at 320–322° C.

Example 5

A mixture of 10 grams of 9-methylamino-methyl-9:10-dihydro - 9:10 - ethano - (1:2) - anthracene, 4 cc. of aqueous formaldehyde solution of 30% strength and 50 cc. of formic acid is heated at 90° C. for 5 hours. After cooling, the reaction mixture is rendered alkaline by the addition of 2 N-sodium hydroxide solution. The oil which has separated is extracted with methylene chloride and the extract evaporated. There remains 9-methylaminomethyl-9:10-dihydro-9:10-ethano-(1:2)-anthracene of the formula

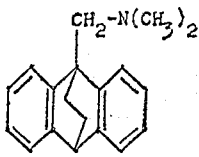

which melts at 78–80° C. after crystallization from ethanol; its hydrochloride melts at 233–234° C. In an analogous manner from 9-(n-butylamino-methyl)-9;10-dihydro-9:10-ethano-(1:2)-anthracene there is obtained 9-(N-methyl - N - n - butylamino - methyl) - 9:10 - dihydro-9:10-ethano-(1:2)-anthracene melting at 257° C. hydrochloride.

Example 6

A solution of 17.8 grams of N-acetyl-9-methylamino-methyl-9:10-dihydro-9:10-ethano-(1:2)-anthracene in 50 cc. of tetrahydrofuran is added dropwise, with stirring to 4 grams of lithium-aluminium hydride in 100 cc. of tetrahydrofuran. The mixture is then stirred for 2 hours at 50° C. 4 cc. of water, 4 cc. of sodium hydroxide solution of 15% strength and 12 cc. of water are then added to the reaction mixture, the precipitate formed is filtered with suction and the filtrate evaporated to dryness under reduced pressure to yield 9-(methyl-ethylamino-methyl)-9:10-dihydro-9:10-ethano - (1:2) - anthracene of the formula

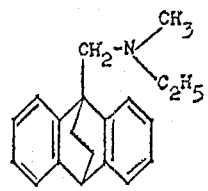

which melts at 77–79° C. after crystallization from methanol; its hydrochloride melts at 235–236° C.

The N-acetyl - 9 - methylamino-methyl-9:10-dihydro-9:10-ethanol-(1:2)-anthracene used as starting material may be prepared in the conventional manner by acetylating 9 - methylamino-9:10-dihydro-9:10-ethano-(1:2)-anthracene with acetyl chloride in pyridine. The compound melts at 128° C. after recrystallization from ethanol.

Example 7

10 grams of 9-cyano-9:10-dihydro-9:10-ethano-(1:2)-anthracene are dissolved in 200 cc. of ethanol. The solution is saturated with ammonia and after the addition of 2 grams of Raney nickel hydrogenated at 70° C. under 70 atmospheres gauge pressure. When the absorption of hydrogen has subsided, the catalyst is filtered off and the filtrate evaporated to dryness under reduced pressure. The residue is treated with 2 N-hydrochloric acid, the hydrochloride of 9-aminomethyl - 9:10 - dihydro-9:10-ethano-(1:2)-anthracene of the formula

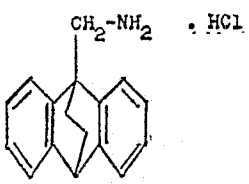

precipitating in the form of crystals melting at 313–315° C.

Example 8

Ethylene is introduced into a solution of 10 grams of 9-dimethylamino-methyl-anthracene in 300 cc. of benzene in an autoclave up to 45 atmospheres gauge pressure, and the mixture is then heated for 12 hours at 170° C.

After the reaction has ceased, the benzene solution is extracted with 2 N-hydrochloric acid, the acidic extract rendered alkaline by the addition of sodium hydroxide solution, and the precipitated base extracted with methylene chloride. After drying and evaporation of the solvent there remains 9 - dimethylamino-methyl-9:10-dihydro-9:10-ethano-(1:2)-anthracene of the formula

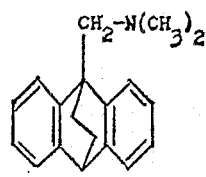

which is converted into its hydrochloride of M.P. 234° C. by the addition of ethanolic hydrochloric acid and diethyl-ether.

The 9-dimethylamino-methyl-anthracene used as starting material may be prepared as follows:

20 grams of 9-chloromethyl-anthracene are heated with 10 grams of dimethylamine in 100 cc. of ethanol for 5 hours in an autoclave at 100° C. The reaction mixture is then evaporated to dryness under reduced pressure, the residue dissolved in ether and the solution extracted with 2 N-sodium hydroxide solution. After drying and evaporation of the ethereal solution there is obtained 9-dimethylamino-methyl-anthracene which after crystallization from ethanol melts at 65–66° C.

Example 9

12 grams of β-[9:10-dihydro-9:10-ethano-(1:2)-9-anthryl]-propionic acid dimethylamide in 50 cc. of tetrahydrofuran are added dropwise with stirring at room temperature to a suspension of 3.5 grams of lithium-aluminium-hydride in 100 cc. of dry tetrahydrofuran; the mixture is then boiled under reflux for 2 hours. 4 cc. of water and 10 cc. of sodium hydroxide solution of 15% strength are then added dropwise while cooling with ice, and the precipitate which settles out is filtered. The filtrate is evaporated to dryness under reduced pressure, the oily residue dissolved in ether and the ether solution extracted with 2 N-hydrochloric acid. The acidic solution is rendered alkaline by the addition of 10 N-sodium hydroxide solution and the precipitated base extracted with ether. After drying and evaporation of the extract there is obtained 9-γ-dimethylamino-propyl-9:10-dihydro-9:10-ethano-(1:2)-anthracene of the formula

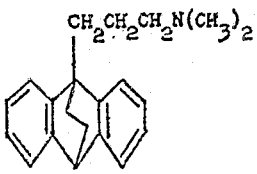

which melts at 88–90° C. after sublimation; its hydrochloride melts at 205–206° C.

The β - [9:10-dihydro-9:10-ethano-(1:2)-9-anthryl]-propionic acid dimethylamide used as starting material may be prepared as follows:

A solution of 10 grams of β-(9-anthryl)-propionic acid (prepared as described by F. H. C. Stewart, Australian Journal of Chem., 13, 483 (1960)) in 200 cc. of dimethylformamide is saturated with ethylene and the mixture heated in an autoclave for 24 hours at 170° C. After cooling, 500 cc. of water are added the precipitate formed filtered off. The precipitate is recrystallized from ethanol to yield β-[9:10-dihydro-9:10-ethano-(1:2)-9-anthryl]-propionic acid of the formula

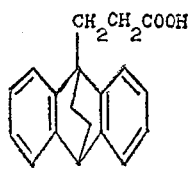

in the form of crystals melting at 218–219° C.

10 grams of the above acid are boiled with 500 cc. of thionyl chloride for 4 hours and the mixture evaporated to dryness under reduced pressure to yield a crystalline residue which is dissolved in 50 cc. of benzene. To this solution there is added dropwise at room temperature, with stirring, a solution of 5 grams of dimethylamine in 50 cc. of benzene. After 2 hours 100 cc. of water are added, the benzene layer separated, dried over sodium sulphate and evaporated. There remains crystalline β-[9:10-dihydro-9:10-ethano-(1:2)-9-anthryl]-propionic acid dimethylamide which can be used without further purification.

Example 10

A solution of 14.0 grams of 2-chloro-anthracene-(9)-aldehyde in 200 cc. of dimethyl-formamide is saturated with ethylene and then heated in an autoclave for 24 hours at 170° C. The dimethylformamide is then distilled off in vacuo. A viscous oil remains behind which is dissolved in 100 cc. of ethanol; after the addition of 10 grams of monomethylamine, the reaction mixture is heated in a bomb tube for 4 hours at 90° C. The solution is evaporated to dryness, the residue dissolved in 200 cc. of ethanol and, after the addition of 2 grams of Raney nickel, hydrogenated under 5 atmospheres gauge pressure. After filtering off the catalyst, the reaction mixture is evaporated to dryness under reduced pressure. The residue is boiled with 100 cc. of 2 N-hydrochloric acid and the hydrochloric acid solution is seprated off. On cooling, an oil separates which crystallizes after being allowed to stand for some time. There is obtained 2-chloro-9-methylamino-methyl-9:10-dihydro-9:10-ethano-(1:2)-anthracene - hydrochloride of the formula

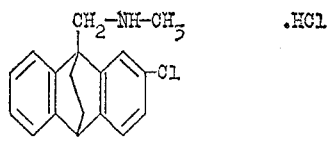

in the form of white crystals which melt at 223–226° C. after crystallization from water.

The 2-chloro-anthracene-(9)-aldehyde used as starting material may be prepared as follows:

A mixture of 42 grams of 2-chloro-anthracene, 54 grams of N-methyl-formamide, 60 grams of phosphorus oxychloride and 40 cc. of dichloro-benzene is heated for 2 hours at 90–95° C. with stirring. A solution of 280 grams of crystalline sodium acetate in 500 cc. of water is then added. A precipitate settles out which is filtered off and boiled with ethanol. The hot ethanol solution is filtered. On cooling the filtrate, 2-chloroanthracene-(9)-aldehyde separates in the form of yellow needles which melt at 148–150° C. after recrystallization from glacial acetic acid.

Example 11

A solution of 5.0 grams of dimethylamine in 50 cc. of benzene is added dropwise and with stirring to 4.0 grams of 1:5 - dichloro-9:10-dihydro-9:10-ethano-(1:2)-anthracene-9-carboxylic acid chloride in 50 cc. of benzene at room temperature. After 2 hours, 100 cc. of water are added and the benzene layer is evaporated to dryness under reduced pressure. The residue is dissolved in 50 cc. of absolute tetrahydrofuran and the resulting solution added dropwise and with stirring to a mixture of 2.0 grams of lithium aluminium hydride and 50 cc. of tetrahydrofuran. The mixture is heated to the boil for 2 hours and then decomposed by the addition of water and sodium hydroxide solution of 15% strength. After filtering off the precipitate which has settled out and evaporating the filtrate, an oil remains which is dissolved in 10 cc. of ethanol. The solution is treated with 0.5 cc. of 10 N-ethanolic hydrochloric acid and the hydrochloride formed is precipitated by the addition of diethyl ether. There is obtained 1:5 - dichloro-9-dimethylamino-methyl-9:10-dihydro-9:10-ethano-(1:2)-anthracene-hydrochloride of the formula

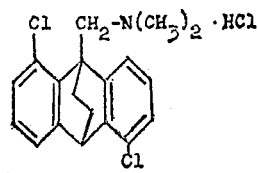

in the form of crystals melting at 158–162° C.

The 1:5 - dichloro - 9:10 - dihydro-9:10-ethano-(1:2)-anthracene-9-carboxylic acid chloride used as starting material may be prepared as follows:

A solution of 12 grams of 1:5-dichloro-anthracene-(9)-carboxylic acid in 200 cc. of dimethylformamide is saturated with ethylene and then heated for 24 hours at 170° C. in an autoclave. The residue which remains after the solution has been evaporated under reduced pressure is dissolved in 2 N-sodium hydroxide solution and filtered through carbon. On acidification of the solution crude 1:5-dichloro - 9:10 - dihydro - 9:10 - ethano - (1:2) - anthracene-9-carboxylic acid precipitates which is filtered off and dried. 10 grams of this acid are boiled for 2 hours with 200 cc. of thionyl chloride. When the solution has been evaporated there remains an oil which crystallizes slowly. After recrystallization from petroleum ether there is obtained 1:5 - dichloro - 9:10 - dihydro-9:10-ethano-(1:2)-anthracene-9-carboxylic acid chloride of the formula

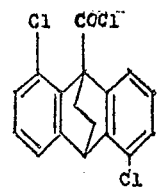

melting at 132–135° C.

Example 12

12 g. of β-[9:10-dihydro-9:10-ethano-(1:2)-anthryl]-propionyl chloride in 75 ml. of methylenechloride are stirred dropwise into a solution of 7 g. of β-hydroxyethyl-piperazine in 75 ml. of methylenechloride. The whole is stirred for 3 hours at room temperature, and the precipitate formed is then filtered off. The filtrate is evaporated and the residue dissolved in 2 N-hydrochloric acid and extracted with ether. The acidic extract is alkalinized and extracted with methylenechloride. The methylenechloride is separated, dried over sodium sulfate and evaporated. The residue, (β-[9:10 - dihydro - 9:10 - ethano-(1:2)-anthryl]-propionic acid-N′-(β-hydroxyethyl)-piperazide), is dissolved in 100 ml. of absolute tetrahydrofuran. This solution is added dropwise to a suspension of 7.5 g. of lithium aluminum hydride in 100 ml. of tetrahydrofuran, and the whole is heated for 2 hours at 50° C., then cooled, whereupon 8 ml. of water, 8 ml. of 15% sodium hydroxide solution and 24 ml. of water are successively dropped in. The resulting precipitate is filtered off and the filtrate is evaporated under vacuum, to leave an oily residue, namely (9-[γ - (N′ - hydroxyethyl - piperazino)-propyl]-9:10-dihydro - 9:10 - ethano-(1:2)-anthracene), which is dissolved in 100 ml. of ethanol. On addition of 10 ml. of 10% alcoholic hydrochloric acid a precipitate is obtained which is recrystallized from methanol, to yield 9-[γ-(N′- hydroxyethyl-piperazino)-propyl] - 9:10 - dihydro - 9:10-ethano-(1:2)-anthracene dihydrochloride of the formula

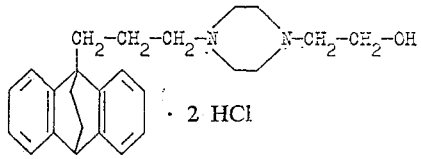

in white crystals melting at 266 to 268° C.

This product may be incorporated, for example, in tablets of the following composition:

|  | Mg. |
|---|---|
| 9 - [γ-(N'-hydroxyethyl-piperazino)-propyl] - 9:10-dihydro - 9:10 - ethano-(1:2)-anthracene dihydrochloride | 250 |
| Talcum | 8 |
| Colloidal silicic acid | 2 |
|  | 260 |

Example 13

34 g. of β-[9,10-dihydro-9,10-ethano-(1,2)-9-anthryl]-propionic acid monomethylamide in 150 ml. of absolute tetrahydrofuran are stirred dropwise at room temperature into a suspension of 10 g. of lithium-aluminium hydride in 250 ml. of absolute tetrahydrofuran, and the mixture is heated for 3 hours at 60° C. and then cooled to 10° C. 10 ml. of water and 10 ml. of 15% sodium hydroxide solution are then dropped in and the precipitate formed is filtered off. The filtrate is evaporated under vacuum, to leave an oil which is dissolved in 50 ml. of ethanol. On addition of 10 N-ethanolic hydrochloric acid and ether, the 9 - (γ-methylaminopropyl)-9,10-dihydro-9,10-ethano-(1,2)-anthracene hydrochloride of the formula

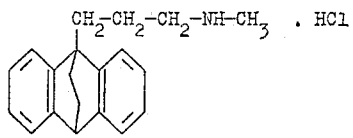

precipitates in the form of white crystals which melt at 230 to 232° C. after recrystallization from isopropanol.

The β-[9,10-dihydro-9,10-ethano-(1,2)-9-anthryl]-propionic acid monomethylamide used as starting material can be prepared in the following manner:

While cooling a solution of 50.0 g. of β-[9,10-dihydro-9,10-ethano-(1,2)-9-anthryl]-propionylchloride in ½ liter of methylenechloride about 20 g. of monomethylamine is introduced into it in the course of one hour. 200 ml. of water are then added, the methylenechloride layer is separated, dried over sodium sulphate and the solvent is distilled off, to yield β-[9,10-dihydro-9,10-ethano-(1,2)-9-anthryl]-propionic acid monomethylamide which melts at 158 to 161° C. after recrystallization from a mixture of methylenechloride+petroleum ether.

Tablets, each containing 25 mg. of active principle, can be prepared, for example, from the following ingredients:

|  | Mg. |
|---|---|
| 9 - (γ - methylamino - propyl) - 9,10 - dihydro-9,10-ethano-(1,2)-anthracene-hydrochloride | 25 |
| Lactose | 35 |
| Wheat starch | 44.4 |
| Colloidal silicic acid | 6 |
| Magnesium stearate | 0.6 |
| Talc | 9 |
|  | 120.0 |

Example 14

A solution of 6.8 g. of β-[10-chloro-9,10-dihydro-9,10-ethano-(1,2)-9-anthryl]-propionic acid dimethylamide in 40 ml. of absolute tetrahydrofuran is stirred dropwise into a suspension of 2.5 g. of lithium-aluminium hydride in 60 ml. of absolute tetrahydrofuran. The mixture is then heated for 3 hours at 70° C., cooled to room temture and 12 ml. of water are cautiously added. The precipitate formed is filtered off, and the filtrate evaporated under vacuum, the oily residue dissolved in ether and the ethereal solution is extracted with 2 N-hydrochloric acid. The acid solution is alkalinized with 10 N-sodium hydroxide solution and the precipitated base is extracted with ether. The extract is dried and evaporated, to leave 9-γ-dimethylaminopropyl - 10 - chloro - 9,10 - dihydro - 9,10-ethano-(1,2)-anthracene of the formula

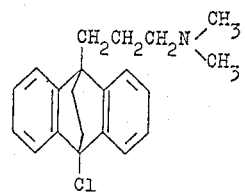

whose hydrochloride melts at 225–226° C.

The β-[10 - chloro - 9,10 - dihydro-9,10-ethano-(1,2)-9-anthryl]-propionic acid dimethylamide used as starting material can be prepared in the following manner:

30 grams of 10-chloro-9-anthraldehyde are stirred into a suspension of 8 g. of sodium borohydride in 200 ml. of ethanol. After 1 hour 150 ml. of water are added. A precipitate is formed which is filtered off and recrystallized from dimethylformamide+methanol, to yield crystalline 9-hydroxymethyl - 10 - chloroanthracene melting at 203–205° C.

26 grams of 9-hydroxymethyl-10-chloroanthracene are mixed with 14 g. of thionylchloride in 100 ml. of dioxan and refluxed for 2 hours. After cooling, 9-chloromethyl-10-chloroanthracene precipitates in crystalline form. After recrystallization from hexane the compound melts at 168–170° C.

16 grams of malonic acid diethyl ester are added to a suspension of 2.5 g. of sodium hydride in 300 ml. of benzene and the whole is heated for 2 hours at 80° C. 24 grams of 9-chloromethyl-10-chloroanthracene are added and the mixture is refluxed for 7 hours. 200 ml. of water are then added at room temperature and the benzene layer is separated. After evaporation of the solvent 1-(10-chloro-9-anthryl) - 2,2 - ethanedicarboxylic acid diethyl ester is obtained; after recrystallization from isopropanol it melts at 88–93° C.

When 27 g. of this ester are boiled in a solution of 80 ml. of 2 N-sodium hydroxide solution and 100 ml. of alcohol and then acidified with 5 N-hydrochloric acid, there is obtained the 1-(10-chloro-9-anthryl)-ethane-2,2-dicarboxylic acid (melting at 216° C.) which on heating to 220° C. gives rise to β-(10-chloro-9-anthryl)-propionic acid by decarboxylation; this compound melts at 190–194° C. after recrystallization from dioxan+petroleum ether.

A solution of 12 g. of β-(10-chloro-9-anthryl)-propionic acid in 250 g. of toluene is heated in an autoclave with ethylene for 20 hours at 170° C. On cooling, crystalline β-[10-chloro-9,10-dihydro-9,10-ethano-(1,2)-9 - anthryl]-propionic acid melting at 280° C. is obtained.

8 grams of this acid are heated for 2 hours with 80 ml. of thionylchloride. On evaporation of the excess thionylchloride, β-[10-chloro-9,10-dihydro-9,10-ethanol- 1,2)-9-anthryl]-propionic acid chloride is obtained which melts at 145–150° C. after recrystallization from hexane.

Dimethylamine is injected for one hour into a solution of 7.5 g. of the acid chloride in 75 ml. of benzene. The precipitate formed is filtered off and the filtrate evaporated under vacuum, to leave a residue which is recrystallized from ether, to yield β-[10-chloro - 9,10 - dihydro-9,10-ethano-(1,2)-9-anthryl]-propionic acid dimethylamide in crystals melting at 143–147° C.

Example 15

17 grams of β-[2-chloro-9,10-dihydro-9,10-ethano-(1,2)-9-anthryl]-propionic acid dimethylamide in 100 ml. of absolute tetrahydrofuran are stirred dropwise into a suspension of 5 g. of lithium-aluminium hydride in 100 ml. of absolute tetrahydrofuran, and the mixture is stirred for 5 hours at 60° C., then cooled and 20 ml. of water are added. The precipitate formed is filtered off and the filtrate evaporated under vacuum, to leave a oil which is mixed with 2 ml. of 10 N hydrochloric acid in alcohol and ether, to yield 2-chloro-9-γ-dimethylaminopropyl-9,10-dihydro-9,10-ethano-(1,2)-anthracene hydrochloride of the formula

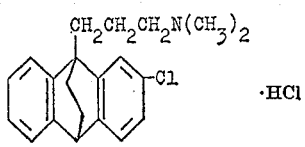

which melts at 171–173° C. after recrystallization from isopropanol.

The β-[2-chloro-9,10-dihydro - 9,10 - ethano-(1,2)-9-anthryl]-propionic acid dimethylamide used as starting material is obtained by the methods described in Example 14 from 2-chloroanthracene-(9)-aldehyde via (a) 2 - chloro-9-hydroxymethylanthracene (M.P. 140–145° C.)
(b) 2-chloro-9-chloromethylanthracene (M.P. 140–143° C.)
(c) 1-(2-chloro-9-anthryl)-2-thane-dicarboxylic acid diethyl ester (oil).
(d) 1 - (2-chloro-9-anthryl)-2-ethane-dicarboxylic acid (M.P. 210° C.)
(e) β - [2 - chloro-9,10-dihydro-9,10-ethano-(1,2)-9-anthryl]-propionic acid (M.P. 170° C.)
(f) β-[2-chloro-9,10-dihydro-9,10-ethano-(1,2) - 9 - anthryl]-propionic acid chloride (oil),
(g) β-[2-chloro - 9,10 - dihydro-9,10-ethano-(1,2)-9-anthryl]-propionic acid dimethylamide (oil).

Example 16

A solution of 30 g. of β-[chloro-9,10-dihydro-9,10-ethano-(1,2)-9-anthryl]-propionic acid dimethylamide in 200 ml. of absolute tetrahydrofuran is stirred dropwise under nitrogen into a suspension of 6 g. of lithium-aluminium hydride in 200 ml. of absolute tetrahydrofuran. The reaction mixture is refluxed for 2 hours, cooled, and 6 ml. of water, 6 ml. of sodium hydroxide solution of 15% strength and 18 ml. of water are added. The whole is completely evaported and the residue dissolved in 200 ml. of 2 N-hydrochloric acid, the solution extracted with ether and the residual aqueous phase is rendered clearly alkaline with concentrated sodium hydroxide solution while being cooled, and extracted with ether. The ethereal extracts are dried over sodium sulphate and evaporated to form an oily residue which is once more dissolved in ether and mixed with the calculated amount of maleic acid in ether, to yield a crystalline maleate of the formula

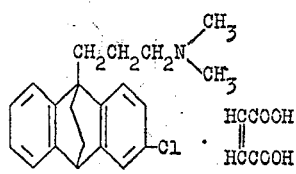

which melts at 154–156° C. after recrystallization from ethanol+ether.

The β-[3 - chloro-9,10-dihydro-9,10-ethano - (1,2)-9-anthryl]-propionic acid dimethylamide used as starting material is obtained in oily form from β-(3-chloro-9-anthryl)-propionic acid (melting at 189–190° C.) by reaction with ethylene oxide to form β-[3-chloro-9,10-dihydro-9,10-ethano-(1,2)-9-anthryl]-propionic acid (melting at 197–199° C.), conversion with thionylchloride into the acid chloride and reaction with dimethylamine.

Example 17

A solution of 25 g. of β-[3-chloro-9,10-dihydro-9,10-ethano-(1,2)-9-anthryl]-propionic acid monomethylamide in 200 ml. of absolute tetrahydrofuran is stirred dropwise under nitrogen into a suspension of 6 g. of lithium-aluminium hydride in 200 ml. of absolute tetrahydrofuran. The reaction mixture is refluxed for 2 hours, cooled, and 6 ml. of water, 6 ml. of sodium hydroxide solution of 15% strength and 18 ml. of water are added. The batch is completely evaporated under vacuum, the residue dissolved in 500 ml. of 2 N-hydrochloric acid, the solution extracted with ether and the aqueous residue rendered distinctly alkaline with concentrated sodium hydroxide solution while being cooled, and then extracted with ether. The ethereal extracts are dried over sodium sulphate and evaporated, to yield 3-chloro-9-(γ-monomethylaminopropyl)-9,10-dihydro-9,10-ethano-1,2-anthracene of the formula

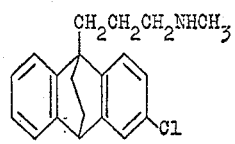

The β - [3-chloro-9,10-dihydro-9,10-ethano-(1,2)-9-anthryl]-propionic acid monomethylamide used as starting material is obtained in oily form from methylamine as described in Example 16.

Example 18

A solution of 23 g. of 2-chloro-9-methylaminomethyl-9,10-dihydro-9,10-ethano-(1,2)-anthracene (cf. Example 10) in 100 ml. of formic acid and 10 ml. of Formalin of 30% strength is heated for 4 hours at 90° C. ½ liter of water is then added and the whole is rendered alkaline with 10 N-sodium hydroxide solution. The precipitating oil is extracted with ether. The ether extract is dried and evaporated, to yield 2-chloro-9-dimethylaminomethyl-9,10-dihydro-9,10-ethano-(1,2)-anthracene of the formula

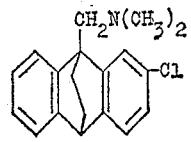

whose hydrochloride melts at 244–245° C.

Example 19

7 grams of N-acetyl-2-chloro-9-ethylaminomethyl-9,10-dihydro-9,10-ethano-(1,2)-anthracene in 50 ml. of absolute tetrahydrofuran are dropped into a suspension of 2 g. of lithium-aluminium hydride in 50 ml. of absolute tetrahydrofuran and the whole is stirred for 4 hours at 50° C., then cooled to room temperature, and 15 ml. of water are cautiously added. The precipitate formed is filtered off and the filtrate evaporated under vacuum to dryness, to leave an oil which is dissolved in 10 ml. of ethanol. On addition of 1.5 ml. of 10 N-hydrochloric acid in alcohol and ether, the hydrochloride of 2-chloro-9-diethylaminoethyl-9,10-dihydro-9,10-ethano-(1,2)-anthracene of the formula

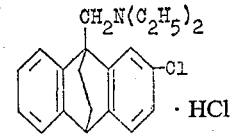

settles out in white crystals melting at 231° C.

The N-acetyl - 2-chloro - 9-ethylaminomethyl - 9,10-dihydro-9,10-ethano-(1,2)-anthracene used as starting material may be obtained by reacting 2-chloro-9-ethylaminomethyl-9,10-dihydro-9,10-ethano - (1,2)-anthracene [prepared with ethylamine, as described in Example 10] with acetic anhydride at 110–120° C. for 5 hours.

Example 20

A mixture of 36 g. of 10-chloro-9,10-dihydro-9,10-ethano-(1,2)-9-anthracene aldehyde and a saturated ethanolic solution of ethylamine is heated in an autoclave for 5 hours at 80° C., whereupon the solution is evaporated under vacuum.

The residue is dissolved in 250 ml. of ethanol, 5 g. of Raney nickel are added, and the mixture is hydrogenated at room temperature. After the catalyst has been filtered off and the solvent evaporated, there remains 9-ethyl-aminomethyl-10-chloro-9,10-dihydro - 9,10-ethanoanthracene of the formula

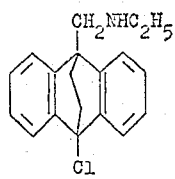

which melts at 88–91° C. after recrystallization from hexane. The hydrochloride melts above 300° C.

Example 21

A solution of 14 g. of N-acetyl-9-ethylaminomethyl-10-chloro-9,10-dihydro-9,10-ethano-(1,2)-anthracene in 50 ml. of absolute tetrahydrofuran is dropped into 5 g. of lithium-aluminium hydride in 100 ml. of absolute tetrahydrofuran, and the batch is then heated for 4 hours at 60° C, whereupon 20 ml of water are cautiously added at room temperature The precipitate formed is filtered off and the filtrate evaporated to dryness under vacuum, to yield 9-diethylaminomethyl - 10-chloro-9,10-dihydro-9,10-ethano-(1,2)-anthracene of the formula

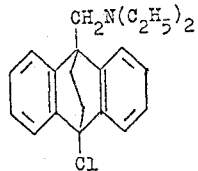

which melts at 116–118° C after recrystallization from ethanol. Its hydrochloride melts at 200–205° C.

The N-acetyl-9-ethylaminomethyl-10-chloro-9,10-dihydro-9,10-ethano-(1,2)-anthracene used as starting material may be prepared by reacting 9-ethylaminomethyl-10-chloro-9,10-dihydro-9,10-ethano-(1,2)-anthracene (cf. Example 18) with acetic anhydride at 110° C. The compound melts at 203–205° C.

Example 22

13 grams of 9-dimethylaminomethyl-9,10-dihydro-9,10-ethano-(1,2)-anthracene are stirred into a mixture of 100 ml. of concentrated sulphuric acid and 10 ml. of concentrated nitric acid, and the mixture is heated for 1 hour at 60° C., then poured over ice and rendered alkaline with 10 N-sodium hydroxide solution. On extraction with methylenechloride, drying and evaporation, a solid residue is obtained which is recrystallized from alcohol, to yield 1,3,6-trinitro - 9-dimethylaminomethyl-9,10-dihydro-9,10-ethano-(1,2)-anthracene of the formula

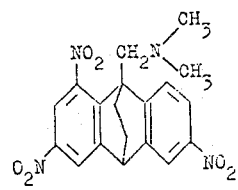

in yellow crystals melting at 183–184° C.

What is claimed is:

1. A member selected from the group consisting of (a) compounds of the formula

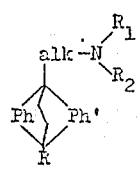

wherein alk represents a lower alkylene radical containing at most 4 carbon atoms, R stands for a member selected from the group consisting of hydrogen, halogen and lower alkyl, and $R_1$ and $R_2$ each represents a member selected from the group consisting of hydrogen, lower alkyl, lower hydroxyalkyl, lower monooxaalkyl, lower monoazalkyl, lower monothiaalkyl, lower alkenyl, cyclo-lower alkyl, cyclo-lower alkyl-lower akyl, Ph''-lower alkyl, and, when taken together with the nitrogen atom a 5–7 membered alkylene imino ring; a saturated 5–7 membered 4-aza alkylene imino ring in which the aza nitrogen is unsubstituted or substituted by a member selected from the group consisting of lower-alkyl, hydroxy lower-alkyl; and morpholino, and wherein Ph and Ph' each represents a member selected from the group consisting of 1,2-phenylene, lower alkyl-1,2-phenylene, lower alkoxy-1,2 - phenylene, halogeno - 1,2-phenylene, trifluoromethyl-1,2-phenylene, nitro-1,2-phenylene and amino-1,2-phenylene, and Ph'' stands for a member selected from the group consisting of phenyl, lower alkoxy-phenyl, lower alkyl-phenyl, halogeno-phenyl, trifluoromethyl-phenyl, and amino-phenyl, and the lower alkyl and alkenyl portion in said substituents contain at most 7 carbon atoms and the cycloalkyl portions in said substituents contain from 4 to 7 ring carbon atoms, (b) their quaternary lower alkyl, lower alkenyl, Ph''-methyl and phenoxy-lower alkyl derivatives wherein the lower alkyl and alkenyl portions contain at most 7 carbon atoms and Ph'' stands for a member selected from the group consisting of phenyl, lower alkoxy-phenyl, lower alkyl-phenyl, halogenophenyl, trifluoromethyl-phenyl, and amino-phenyl, and the lower alkyl and alkenyl portion in said substituents contain at most 7 carbon atoms and the cycloalkyl portions in said substituents contain 4 to 7 ring carbon atoms, and (c) their acid addition salts.

2. A compound as claimed in claim 1 having the formula

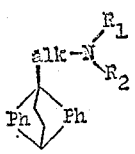

wherein alk represents a lower alkylene radical containing at most 4 carbon atoms, $R_1$ and $R_2$ each stands for a member selected from the group consisting of lower alkyl, and, when taken together with the nitrogen atom a 5–7 membered alkylene imino ring; a saturated 5–7 membered 4-aza alkylene imino ring in which the aza nitrogen is unsubstituted or substituted by a member selected from the group consisting of lower-alkyl, hydroxy lower-alkyl; and morpholino, and wherein Ph and Ph' each represents a member selected from the group consisting of 1,2-phenylene, lower alkyl-1,2-phenylene, lower alkoxy-1,2-phenylene, halogeno - 1,2 - phenylene and trifluoromethyl-1,2-phenylene, the lower alkyl portions in said radicals containing at most 7 carbon atoms, said compound being in a form selected from the free form and the form of an acid addition salt thereof.

3. A compound as claimed in claim 1 being in the form of a therapeutically useful acid addition salt.

4. A therapeutically useful acid addition salt of a compound having the formula indicated in claim 2.

5. A compound as claimed in claim 1 and having the formula

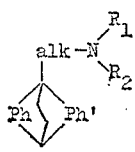

wherein alk is a lower alkylene radical with at most 4 carobn atoms, R₁ is a member selected from the group consisting of hydrogen and lower alkyl and R₂ is a lower alkyl radical and each of the radicals Ph and Ph' is a member selected from the group consisting of 1,2-phenylene and halogeno-1,2-phenylene.

6. A therapeutically useful acid addition salt of a compound having the formula indicated in claim 5.

7. A compound as claimed in claim 1 and having the formula

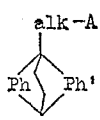

wherein alk is a lower alkylene radical with at most 4 carbon atoms, A is a member selected from the group consisting of N-lower alkyl-piperazino and N-(hydroxy-lower alkyl)-piperazino and each of the radicals Ph and Ph' is a member selected from the group consisting of 1,2-phenylene and halogeno-1,2-phenylene.

8. A therapeutically useful acid addition salt of a compound having the formula indicated in claim 7.

9. A compound as claimed in claim 1 and having the formula

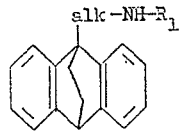

wherein R₁ is lower alkyl and alk a lower alkylene radical with at most 4 carbon atmos, said compound being in a form selected from the free form and the form of a therapeutically useful acid addition salt thereof.

10. A compound as claimed in claim 1 and having the formula

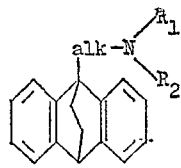

wherein R₁ and R₂ each represents a lower alkyl radical and alk represents a lower alkylene radical with at most 4 carbon atoms, said compound being in a form selected from the free form and the form of a therapeutically useful acid addition salt thereof.

11. A compound as claimed in claim 1 and having the formula

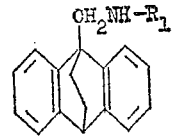

wherein R₁ is a lower alkyl radical, said compound being in a form selected from the free form and the form of a therapeutically useful acid addition salt thereof.

12. A compound as claimed in claim 1 and having the formula

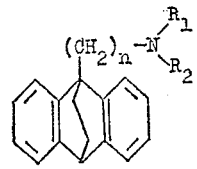

wherein $n$ is 1 or 3 and R₁ is a member selected from the group consisting of hydrogen and lower alkyl and R₂ is lower alkyl, said compound being in a form selected from the free form and the form of a therapeutically useful acid addition salt thereof.

13. A compound as claimed in claim 1 being a member selected from the group consisting of 9-methylamino-methyl-9:10-dihydro-9:10-ethano-(1:2)-anthracene and a therapeutically useful acid addition salt thereof.

14. A compound as claimed in claim 1 being a member selected from the group consisting of 9-n-butylamino-methyl-9:10-ethano-(1:2)-anthracene and a therapeutically useful acid addition salt thereof.

15. A compound as claimed in claim 1 being a member selected from the group consisting of 9-dimethylamino - methyl - 9:10 - dihydro - 9:10 - ethano - (1:2)-anthracene and a therapeutically useful acid addition salt thereof.

16. A compound as claimed in claim 1 being a member selected from the group consisting of 9-diethylamino-methyl - 9:10 - dihydro - 9:10 - ethano - (1:2) - anthracene and a therapeutically useful acid addition salt thereof.

17. A compound as claimed in claim 1 being a member selected from the group consisting of 9-(methyl-ethyl-amino - methyl) - 9:10 - dihydro - 9:10 - ethano - (1:2)-anthracene and a therapeutically useful acid addition salt thereof.

18. A compound as claimed in claim 1 being a member selected from the group consisting of 9-(N-methyl-N-n - butylamino - methyl) - 9:10 - dihydro - 9:10 - ethano-(1:2)-anthracene and a therapeutically useful acid addition salt thereof.

19. A compound as claimed in claim 1 being a member selected from the group consisting of 9-γ-dimethyl-amino - propyl - 9:10 - dihydro - 9:10 - ethano - (1:2)-anthracene and a therapeutically useful acid addition salt thereof.

20. A compound as claimed in claim 1 being a member selected from the group consisting of 9-(γ-methyl-amino - propyl) - 9,10 - dihydro - 9,10 - ethano - (1,2)-anthracene and a therapeutically useful acid addition salt thereof.

21. A compound as claimed in claim 1 being a member selected from the group consisting of 2-chloro-9-methylamino - methyl - 9:10 - dihydro - 9:10 - ethano - (1:2)-anthracene and a therapeutically useful acid addition salt thereof.

22. A compound as claimed in claim 1 being a member selected from the group consisting of 2-chloro-9-(γ-dimethylaminopropyl) - 9:10 - dihydro - 9:10 - ethano-(1:2)-anthracene and a therapeutically useful acid addition salt thereof.

23. A compound as claimed in claim 1 being a member selected from the group consisting of 2-chloro-9-dimethylaminomethyl - 9:10 - dihydro - 9:10 - ethano-(1:2)-anthracene and a therapeutically useful acid addition salt thereof.

24. A compound as claimed in claim 1 being a member selected from the group consisting of 2-chloro-9-diethylaminomethyl - 9:10 - dihydro - 9:10 - ethano - (1:2)-anthracene and a therapeutically useful acid addition salt thereof.

25. A compound as claimed in claim 1 being a member selected from the group consisting of 10-chloro-9-ethylaminomethyl - 9:10 - dihydro - 9:10 - ethano - (1:2)-anthracene and a therapeutically useful acid addition salt thereof.

No references cited.

HENRY R. JILES, *Primary Examiner.*

UNITED STATES PATENT OFFICE
CERTIFICATE OF CORRECTION

Patent No. 3,399,201                                 August 27, 1968

Paul Schmidt et al.

It is certified that error appears in the above identified patent and that said Letters Patent are hereby corrected as shown below:

Column 2, line 35, cancel "human". Column 4, line 6, "orgainc" should read -- organic --; line 16, "cyclic, 4-aminosalicyclic" should read -- cylic, 4-aminosalicylic --; line 54, cancel "also". Column 5, line 11, "ehtanol" should read -- ethanol --; line 14, "dimethylamide" should read -- diethylamide --. Column 7, line 13, "9;10" should read -- 9:10 --. Column 12, line 66, "[10-chloro-9,10-dihydro-9,10-ethanol-" should read -- [10-chloro-9,10-dihydro-9,10-ethano- --. Column 13, line 44, "[chloro" should read -- [3-chloro --. Column 17, line 23, "carobn" should read -- carbon --; line 57, "atmos" should read -- atoms --.

Signed and sealed this 10th day of February 1970.

(SEAL)
Attest:

EDWARD M. FLETCHER, JR.
Attesting Officer
                                         WILLIAM E. SCHUYLER, JR.
                                         Commissioner of Patents

Disclaimer

3,399,201.—*Paul Schmidt,* Therwil, *Max Wilhelm,* Allschwil, and *Kurt Eichenberger,* Therwil, Switzerland. AMINOALKYL-ETHANO-ANTHRACENES. Patent dated Aug. 27, 1968. Disclaimer filed Oct. 22, 1984, by the assignee, *Ciba-Geigy Corp.*

Hereby enters this disclaimer to claims 1–19 and 21–25 of said patent.
[*Official Gazette December 11, 1984.*]